No. 867,773. PATENTED OCT. 8, 1907.
A. DEE P. WEAVER & J. E. CARNEY.
ATTACHMENT FOR TALKING MACHINES.
APPLICATION FILED MAR. 15, 1907.

2 SHEETS—SHEET 1.

WITNESSES
Joshua Bergstrom
Walter Harrison

INVENTORS
Alfred dee Pinckney Weaver
John Edward Carney
BY Munn & Co
ATTORNEYS

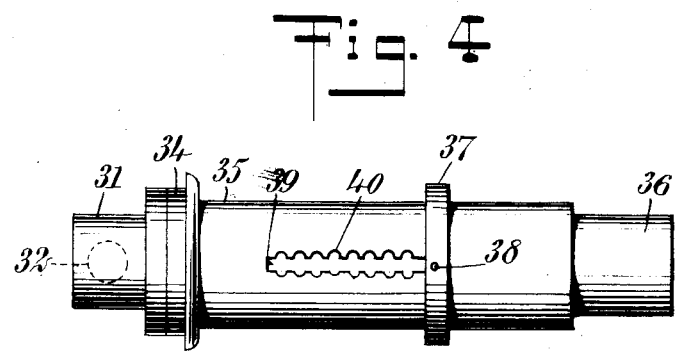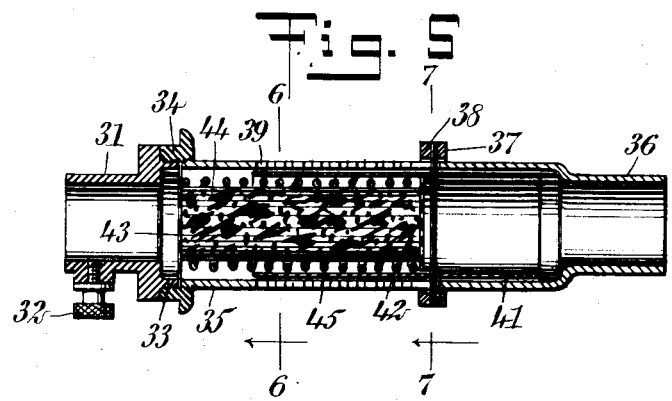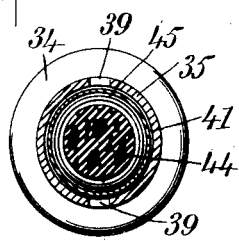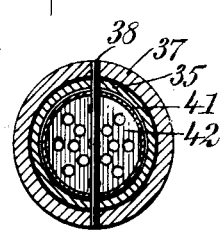

UNITED STATES PATENT OFFICE.

ALFRED DEE PINCKNEY WEAVER AND JOHN EDWARD CARNEY, OF MONTGOMERY, ALABAMA; SAID WEAVER ASSIGNOR TO SAID CARNEY.

ATTACHMENT FOR TALKING-MACHINES.

No. 867,773.   Specification of Letters Patent.   Patented Oct. 8, 1907.

Application filed March 15, 1907. Serial No. 362,473.

*To all whom it may concern:*

Be it known that we, ALFRED DEE PINCKNEY WEAVER and JOHN EDWARD CARNEY, both citizens of the United States, and residents of Montgomery, in the county of Montgomery and State of Alabama, have invented a new and Improved Attachment for Talking-Machines, of which the following is a full, clear, and exact description.

Our invention relates to sound recording and reproducing machines, including phonographs, graphophones, and all other types of so-called talking machines.

Reference is made to the accompanying drawings, forming a part of this specification, in which similar characters of reference indicate corresponding parts in all the figures.

Figure 1:
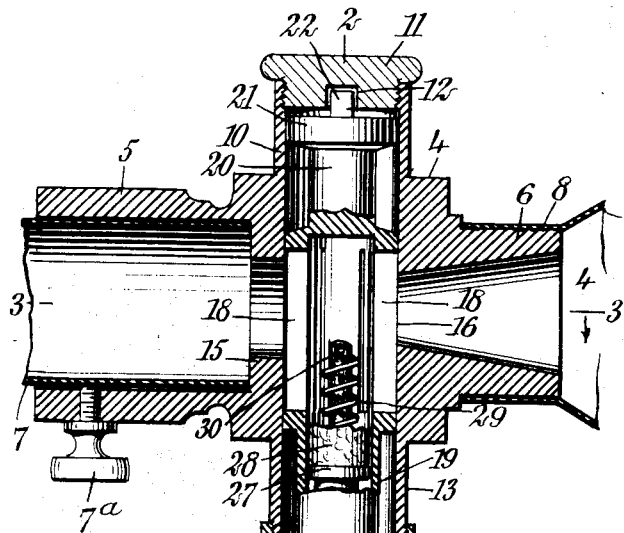
Figure 2:
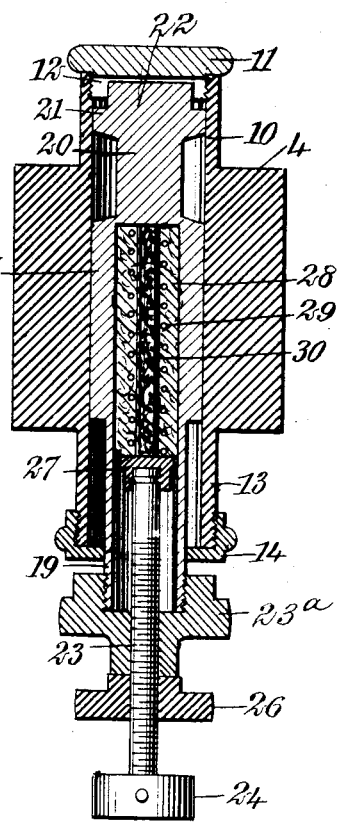
Figure 3:
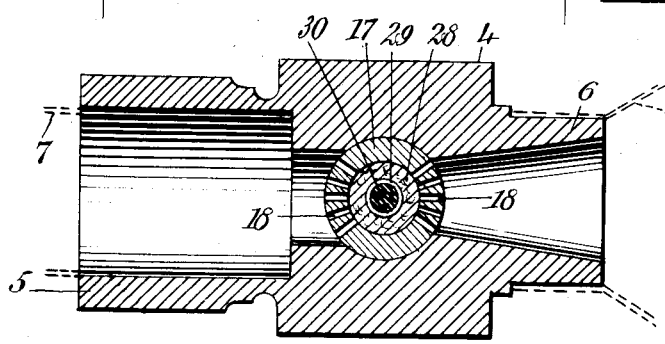

Figure 1 is a fragmentary, horizontal section through the attachment, showing how it is connected with the horn and with the recorder or reproducer, as the case may be, of the talking machine, and also showing the porous material for breaking up the resonance of the air column; Fig. 2 is a central vertical section upon the line 2—2 of Fig. 1, showing more particularly the internal construction of the attachment and the details of the porous material used for destroying the resonance of the air column; Fig. 3 is a section upon the line 3—3 of Fig. 1, looking in the direction of the arrow, and showing the cylindrical grid used for containing the porous material, and also for adjusting the device so as to regulate the volume of sounds; Fig. 4 is a plan view of a modified form of our attachment and showing the movable collar used for controlling the degree of compression of the porous material; Fig. 5 is a central section through the construction shown in Fig. 4 and showing the material used as a compressible mass of sponge rubber encircled by a spring for restoring the mass after compression; Fig. 6 is a vertical cross section upon the line 6—6 of Fig. 5 looking in the direction of the arrow. and showing the concentric arrangement of the mass of sponge rubber, the spring encircling the mass, and the telescopic tubes encircling the rubber and spring; and Fig. 7 is a vertical cross section upon the line 7—7 of Fig. 5, looking in the direction of the arrow and showing the pin for holding the telescopic tubes in various predetermined positions, thereby regulating the degree of compression of the sponge material.

A casing 4 is provided with collars 5, 6, the collar 5 being adapted to engage a tube 7 of the recorder or reproducer, as the case may be, and the collar 6 being adapted to fit into the smaller end 8 of a horn 9. A set screw 7ª is revolubly mounted within the collar 5 and is adapted to engage the tube 7 for the purpose of holding the collar 5 upon the latter. This set screw 7ª also enables the collar 5 to be adjusted within proper limits upon the tube 7. The casing 4 is further provided with a tubular extension 10 into which fits a screw cap 11 having a slot 12 disposed internally thereof. The casing 4 is still further provided with a tubular extension 13 over which fits an annular screw cap 14. Within the casing 4 are sound passages 15, 16 in registry with each other, the passage 16 being frusto-conical in shape. Revolubly mounted within the casing 4 is a cylinder 17 provided with oppositely disposed sound passages 18 arranged in two groups, as indicated in Fig. 3. The cylinder 17, thus provided with the sound passages 18, constitutes a cylindrical grid. This grid is provided with a tubular extension 19 and with a reduced portion 20, the latter terminating in a head 21. This head is provided with lug 22 adapted to fit neatly into the slot 12, so as to prevent rotation of the cylindrical grid 17 when the lug is inserted within the slot, as indicated in Fig. 1.

A screw 23 passes through an annular screw cap 23ª, the latter being mounted upon the tubular extension 19 of the cylindrical grid. A disk 24 is mounted upon the outer end of the screw 23 and a pin 25 extends through the disk 24 and screw 23 for enabling the screw to be turned at will. A nut lock 26 is mounted upon the screw 23 and is adapted to engage the screw cap 23ª so as to prevent movement of the screw 23. A head 27 is swiveled upon the screw 23 and is adapted to move within the tubular extension 19, and also within the cylindrical grid 17, these parts being continuations of each other.

A mass 28, of compressible porous material, preferably raw cotton fibers, is arranged in the form of a cylinder and disposed within the cylindrical grid 17, projecting partly into the tubular extension 19 of the same. A spiral spring 29, of the so-called "compression type", is embedded within the porous material 28 and serves to restore the latter to its normal condition after having been compressed. A mass 30 of sponge rubber, or other material having interstices, is mounted centrally within the tubular mass 28 of porous material, and is encircled by the spiral spring 29. Preferably the spring 29 does not directly engage the sponge rubber.

The operation of the device shown in Figs. 1, 2 and 3 is as follows: The collar 5 being fixed upon the tube 7 of the reproducer or recorder, and being properly adjusted, is tightened in position by the set screw 7ª. The horn 9 is next mounted in position by slipping its smaller end 8 over the collar 6. The degree of compression desired for the sponge rubber 30 and the porous, fibrous material 28, is now determined upon, and the screw 23 is turned accordingly. To this end the lock nut 26 is first loosened, and after adjustment of the screw, is tightened. The cylindrical grid 17 is now turned (see Fig. 3) to any desired angle by aid of the screw cap 14. This exposes any desired number of slots 18. In order to be able to turn the nut lock 26 and to adjust the screw caps 23ª and 14, the lug 22 is inserted within the slot 12, as indicated in Fig. 1. This prevents rotation of the cylindrical grid 17 until the adjustments are completed. The sounds passing through the sound passages 15, 16 necessarily pass in a lateral direction through the cylindrical grid 17 and through the cylinder 28 of porous material, also through the sponge rubber 30. The resonance of the air column in occupying the air passage 15, 16 is broken up, as above described and the intensity of the sound may be altered and to any desired degree depending upon the compression exerted by the screw 23. If, now, it be desired to restore the talking machine to its usual condition; or in other words, to remove the agency used for breaking up the resonance of the air column, the cylindrical grid 17 is moved axially outward (toward the bottom of the sheet according to Figs. 1 and 2). The reduced portion 20 is thus brought into alinement with the air passages 15, 16, and the sound waves by passing around this reduced portion are not compelled to pass through the cylindrical grid or the compressible media contained by it.

In the form shown in Fig. 4 a collar 31 is provided with a screw 32 whereby it may be secured upon the tube of a reproducer or a recorder, as the case may be, and held in position firmly by the screw 32. An annular neck 33 is threaded internally and is fitted with an annular collar 34 threaded internally. A cylindrical barrel 35 is threaded at one of its ends and fitted within the collar 34, the other end 36 of this cylindrical barrel being somewhat reduced. An annular collar 37 encirces the cylindrical barrel 35 and carries a pin 38 extending diametrically through this cylindrical barrel. For this purpose a slot 39 is provided. In order that the pin 38 may be lodged at any predetermined point along the slot 39, the latter is merged into indentations 40, as will be understood from Fig. 4. An inner cylinder 41 is telescopically mounted within the barrel 35. A perforated disk 42 is mounted within the inner cylinder 41 and secured rigidly thereto. Another perforated disk 43 is clamped between one end of the barrel 35 and the collar 34. A mass 44, of sponge rubber, is encircled by a spiral compression spring 45, the latter being loosely mounted within the inner cylinder 41. In order to compress the mass 44 of sponge rubber, the collar 38 is pushed to the left, according to Fig. 6, carrying with it the pin 38 and inner tube 41. This shortens the member of sponge rubber and also compresses the spring 45. In order to lock the parts in this position, the collar 37 is next turned slightly to the right, or to the left, as the case may be, so as to lodge the pin 38 in a pair of the indentations 40. In order to allow the sponge rubber to expand to any desired extent, the pin 38 is loosened from the indentations 40, by slightly turning the collar 48, and is removed to the right according to Fig. 5. The horn is fitted upon the reduced portion 36 of the barrel 35.

The general action of the device shown in Figs. 4, 5 and 6 will be substantially the same as that shown in the other figures; that is to say, the sponge rubber is compressed or allowed to expand, according to the degree of porosity which the operator desires to confer upon it, and which is, therefore, regulated at will. The resonance of the air column is prevented, as above described, with reference to Figs. 1, 2 and 3.

Having thus described our invention, we claim as new and desire to secure by Letters Patent:

1. The combination of a casing, a grid mounted therein, a mass of porous material connected with said grid for permitting passage of sound waves therethrough while preventing undue resonance, and means controllable at will for changing the position of said grid for the purpose of affecting sounds passing through the same.

2. The combination of a casing, a cylindrical grid mounted therein, a mass of porous material mounted within said cylindrical grid, means controllable at will for exerting different degrees of pressure upon said material for the purpose of governing the porosity thereof, and means for moving said cylindrical grid for the purpose of affecting the sounds passing through said material.

3. The combination of a member provided with a sound passage, a cylindrical grid mounted within said sound passage, a member of rubber sponge mounted within said cylindrical grid, a cylinder of cotton fiber encircling said rubber member, a spring for restoring said rubber member and said cylinder of cotton fiber after compression of the same, and means controllable at will for compressing said rubber member and said cylinder of cotton fiber to a predetermined extent.

4. The combination of a longitudinal hollow member provided with a sound passage, a mass of porous material mounted within said sound passage and extending transversely of the general axis thereof, and means for compressing said mass of porous material in a direction crossing said axis of said longitudinal hollow member.

5. The combination of a casing, a revoluble cord mounted therein for the purpose of regulating the capacity of said casing for transmitting sound waves, and a mass of porous material mounted within said cord and compressible in a direction crossing the general direction of propagation of said sound waves.

6. The combination of a casing, a revoluble cord mounted therein and provided with slots serving as sound passages, and means for turning said cord relatively to said casing.

7. The combination of a casing provided with a sound passage, a revoluble cord mounted within said casing and partially obstructing the same, the axis of said cord crossing the general direction of propagation of the sound waves, and means for moving said cord in the general longitudinal direction of its own axis of rotation, for the purpose of partially obstructing said sound waves.

8. The combination of a casing provided with a sound passage, a revoluble cord mounted within said casing and provided with sound passages, and means for securing said revoluble cord in a predetermined fixed position.

9. The combination of mechanism provided with a sound passage, a member of compressible material partially obstructing said sound passage, and a spiral spring depressed within said member of compressible material, and means for compressing said compressible material and said spiral spring.

10. The combination of a casing provided with a sound passage extending therethrough, a core of compressible material mounted within said casing and adapted to partially obstruct the propagation of the sound waves therethrough, a central spring disposed concentrically to said core of compressible material, and means controllable at will for compressing both said core and said spring, to any desired extent.

In testimony whereof we have signed our names to this specification in the presence of two subscribing witnesses.

ALFRED DEE PINCKNEY WEAVER.
JOHN EDWARD CARNEY.

Witnesses:
 DORIS FABER,
 D. G. WHITTINGTON.